March 31, 1959     H. E. SCHULTZE     2,880,022
SHOCK ABSORBER PACKING HAVING LINE ENGAGEMENT
Filed Dec. 5, 1956

INVENTOR.
HAROLD E. SCHULTZE
BY
his ATTORNEY

United States Patent Office 2,880,022
Patented Mar. 31, 1959

2,880,022

SHOCK ABSORBER PACKING HAVING LINE ENGAGEMENT

Harold E. Schultze, Dayton, Ohio, assignor to General Motors Corporation, Detroit, Mich., a corporation of Delaware Application December 5, 1956, Serial No. 626,459

6 Claims. (Cl. 286—30)

This invention relates to improvements in packing members adapted for encircling a reciprocative rod and sealing around the rod against loss of fluid along the surface of the rod. The invention particularly relates to a seal member for the reciprocative rod of a direct acting shock absorber.

In the manufacture of shock absorbers, it is common practice to provide a seal member of a rubber or rubber-like material between the reciprocative rod and the housing of the shock absorber to prevent loss of shock absorber fluid through the opening in which the reciprocative rod works. These rubber or rubber-like seal members are satisfactory under normal working conditions of relatively low temperature such as below about 250° F., but in certain applications, the temperature of the shock absorber and the oil in the shock absorber rises to a much higher temperature such as 400° or 500° F. Under these circumstances the rubber or rubber-like materials age rapidly with a resultant loss of resilience and thus lose their sealing effect on the reciprocative rod of the shock absorber so that fluid loss occurs along the surface of the rod after a relatively short period of operation under high temperature conditions.

In this invention the seal member that is provided between the rod and the end wall of the shock absorber through which the rod extends is formed of a relatively solid material but having compressive resilience so that the seal member will be continuously urged against the reciprocative rod. The seal member is shaped with one or both ends in the form of a truncated cone that engages a seal seat that is also in the form of a truncated cone, but there is provided a differential of angle between the truncated cone shaped surface of the seal and the truncated cone shaped surface of the seal seat so that the apex portion of the seal will engage the seal seat in substantially line contact so that when pressure is applied axially of the seal member the ends of the seal will be compressed radially toward the reciprocative rod and thereby maintain seal engagement with the surface of the rod.

Preferably, the seal member is made of polytetrafluoroethylene which has self lubricating properties and is relatively unaffected by high temperatures of as much as 600–700° F. While the polytetrafluoroethylene is generally considered a solid material, yet it has sufficient compressive resilience that the material can be affected with a change in the shape of the mass to conform accurately with the surface engaged by the material.

In this invention therefore an annularly shaped member of polytetrafluoroethylene is provided with its opposite ends in the shape of truncated cones that engage a recess in a wall of the shock absorber through which the reciprocative rod extends and a compression gland that urges the seal member axially of the rod so that the apex portions of the truncated cone ends of the seal are compressed against the rod and thereby seal the rod against leakage of fluid.

Further objects and advantages of the present invention will be apparent from the following description, reference being had to the accompanying drawings wherein a preferred form of the invention is clearly shown.

Figure 2:
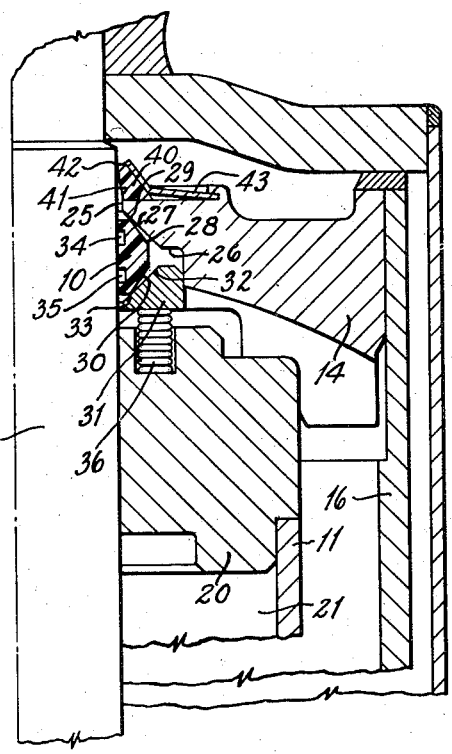
Fig. 2 is an enlarged cross sectional view of the seal of the invention.
Figure 1:
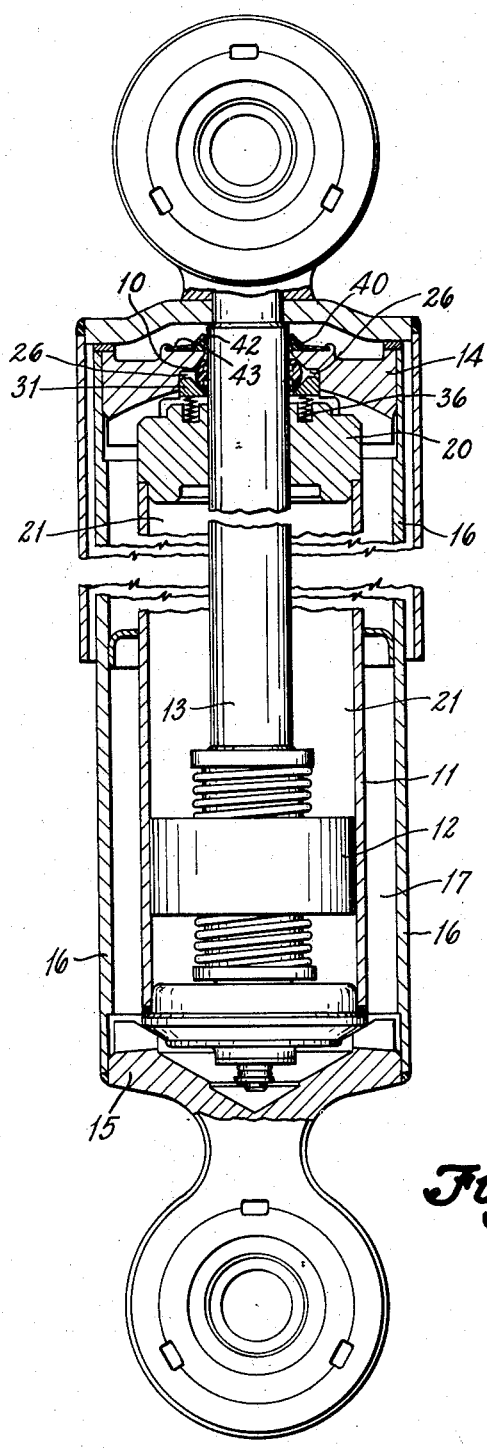
Fig. 1 is a cross sectional view of a shock absorber incorporating the seal of this invention.

In this invention the seal member 10 is used in a direct acting shock absorber that includes a cylinder 11 and a reciprocating piston 12. The piston 12 is carried on the end of a reciprocative rod 13 that extends through the closure wall 14 of the cylinder 11. The rod 13 is adapted to be secured to one movable part of a vehicle while the closure wall 15 that is at the opposite end of the cylinder 11 is adapted to be secured to another movable part of the vehicle. The closure walls 14 and 15 are connected by a cylinder 16 that surrounds the cylinder 11 to form a fluid reservoir chamber 17. The operation of the shock absorber is the same as any conventional direct acting shock absorber.

The cylinder 11 carries a closure wall 20 that forms a bearing and guide for the rod 13 and also closes the upper end of the cylinder 11 to form fluid compression chamber 21.

The closure wall 14 has an opening 25 that is in alignment with the opening in the rod guide 20 and through which the reciprocative rod 13 extends. The wall 14 has a recess 26 that forms a seal chamber for the seal member 10. This seal chamber 26 has a wall portion 27 that is in the form of a truncated cone with the angle of the cone being an acute angle with the axis of the rod 13.

The seal member 10 is an annular member that surrounds the rod 13 and has the inner peripheral surface engaging the outer surface of the rod 13. One end of the seal member 10 has the outer peripheral surface 28 in the form of a truncated cone that is at an acute angle to the axis of the rod 13.

However, as illustrated in the drawing, the acute angle of the truncated cone 28 is less than the acute angle of the truncated cone 27 so that there is a differential angle between the surfaces formed by the cones 28 and 27. Thus the apex portion 29 of the truncated cone shaped surface 28 engages the cone shaped surface 27 along a line contact near the apex end portion of the surface 28.

Similarly, the opposite end of the seal member 10 has the outer peripheral surface 30 formed in the shape of a truncated cone that is at an acute angle to the axis of the rod 13. A compression gland 31 is located within the seal chamber 26 and has a surface 32 that is in the form of a truncated cone also at an acute angle to the axis of the rod 13. The cone shaped surfaces 30 and 32 are also at different acute angles comparable to the surfaces 27 and 28 at the opposite end of the seal member 10 so that a differential angle is effected between the surfaces 30 and 32 with the result that the apex end portion 33 of the seal member 10 engages the surface 32 at substantially a line contact.

A recess or groove 34 is provided in substantially radial alignment with the truncated cone shaped surface 28 at one end of the seal member 10 and a similar groove 35 is provided at the opposite end of the seal member substantially in alignment with the surface 30. These grooves 34 and 35 provide for a certain amount of resilience in the end portions of the seal member 10 so that the ends of the seal member can be flexed against the outer peripheral surface of the reciprocative rod 13.

The compression gland 31 is spring urged in an axial direction against the seal member 10 by means of a plurality of compression springs 36 located between the gland 31 and the rod guide 20. The seal member 10 is made of polytetrafluoroethylene which has the property of self-lubrication and is highly resistant to the effects of high temperature, the material normally being sintered at about 750° F., and being stable within temperature ranges below 700° F. Also, the polytetrafluoroethylene has the property of compressive resilience that allows for a change in the form of the mass by which the surface of the mass can conform accurately to other surfaces engaged by the mass without clinging or sticking to the surfaces.

From the foregoing description it will therefore be apparent that the compression gland 31 will constantly apply axial pressure to the seal member 10 through action of the springs 36 with the result that the line contact at the apex end portions 29 and 33 of the seal member 10 will cause radial compression of the end portions of the seal member into surface contact with the reciprocative rod 13, the grooves 34 and 35 aiding the resilience of the end portions of the seal member to allow for the radial compression of the end portions of the seal member.

A scraper ring 40 is provided on the exterior side of the shock absorber seal and has the inner surface 41 in the form of a truncated cone to provide a differential axle between the surface of the rod 13 and the cone shaped surface 41 with the result that the apex portion 42 of the scraper ring engages the surface of the rod 13 to remove dirt from the surface of the rod when it reciprocates into the seal member 10.

A spring disk 43 engages the scraper ring 40 to maintain it in engagement with the rod 13 and apply pressure at the apex portion 42 of the ring 40 urging the sharp edge of the truncated cone shaped surface 41 into engagement with the rod 13.

The scraper ring 40 is also made of polytetrafluoroethylene that is highly resistant to abrasion in addition to the properties heretofore mentioned with the result that the scraper ring 41 has a long life at the high temperatures of operation of the shock absorber.

While the form of embodiment of the invention as herein disclosed constitutes a preferred form, it is to be understood that other forms might be adopted as may come within the scope of the claims which follow.

What is claimed is as follows.

1. A packing to seal on a reciprocative rod to prevent movement of liquid axially of the rod from a chamber from which the rod extends through a wall of the chamber, including, a chamber wall having an opening therein, a reciprocative rod in said opening and extending through said wall, said wall having a recess axial of said rod and forming a seal chamber, said recess having a wall portion in the form of a truncated cone extending from said wall opening and coaxial with said rod, a compressively resilient seal member around said rod within said chamber and engaging the outer periphery of said rod for sliding movement of the rod in the seal member, one end of said seal member having the external periphery in the form of a truncated cone having an acute angle with the axis of the rod less than the acute angle of said wall portion with said rod and non-conformable with the said wall portion under all normal conditions of pressure engagement of the said end of said seal member with the said wall portion to effect thereby substantially line engagement of the apex portion only of said end of said seal member with said wall portion, said seal member having an annular groove extending inwardly from the inner periphery of the seal member in radial alignment with the said truncated end thereof providing for radial flexibility of the said end portion only, and spring means in said chamber effective on said seal member urging the same axially of said rod to effect pressure engagement of the apex and of the truncated end of the seal member with the said truncated wall portion to compress the apex portion of the truncated end of the seal member radially inwardly against the said rod.

2. A packing in accordance with claim 1 that includes an annular ring on said chamber wall on the side thereof opposite to that engaged by said seal member, said ring having an inner periphery adjacent said rod in the form of a truncated cone with the apex portion only engaging said rod axially outwardly from the wall that supports said ring, and spring means engaging said ring to effect compression of the end portion only thereof forming the apex portion of the truncated cone to effect line engagement of the said end portion with the said rod.

3. A packing to seal on a reciprocative rod to prevent movement of liquid axially of the rod from a chamber from which the rod extends through a wall of the chamber, including, a chamber wall having an opening therein, a reciprocative rod in said opening and extending through said wall, said wall having a recess axial of said rod and forming a seal chamber, said recess having a wall portion in the form of a truncated cone extending from said wall opening and coaxial with said rod, a compressively resilient seal member of polytetrafluoroethylene around said rod within said chamber and engaging the outer periphery of said rod for sliding movement of the rod in the seal member, one end of said seal member having the external periphery in the form of a truncated cone having an acute angle with the axis of the rod less than the acute angle of said wall portion with said rod and non-conformable with the said wall portion under all normal conditions of pressure engagement of the said end of said seal member with the said wall portion to effect thereby substantially line engagement of the apex portion only of said end of said seal member with said wall portion, and spring means in said chamber effective on said seal member urging the same axially of said rod to effect pressure engagement of the apex end of the truncated end of the seal member with the said truncated wall portion to compress the apex portion of the truncated end of the seal member radially inwardly against the said rod.

4. A packing to seal on a reciprocative rod to prevent movement of liquid axially of the rod from a chamber from which the rod extends through a wall of the chamber, including, a chamber wall having an opening therein, a reciprocative rod in said opening and extending through said wall, said wall having a recess axial of said rod and forming a seal chamber, said recess having a wall portion in the form of a truncated cone extending from said wall opening and coaxial with said rod, a compressively resilient seal member around said rod within said chamber and engaging the outer periphery of said rod for sliding movement of the rod in the seal member, each of opposite ends of said seal member having the exterior periphery in the form of a truncated cone with the bases of the cones in adjacent relationship and each having an acute angle with the axis of the rod, a compression gland around said rod in said chamber and having a wall portion in the form of a truncated cone coaxial with said rod, said truncated seal member ends having the acute angle thereof less than the acute angle of the said wall portions with the said rod and non-conformable with the said wall portion under all normal conditions of pressure engagement of the said end of said seal member with the said wall portion to effect thereby substantial line engagement of the apex portions only of said ends of said seal member with the said wall portions of said wall and said gland, and spring means engaging said gland effective to urge the same and said seal member axially of said rod to simultaneously effect pressure engagement of the apex ends of the truncated ends of the seal member with the said truncated wall portions of said wall and gland to compress the apex portions of the truncated ends of the seal member radially inwardly against the said rod.

5. A packing to seal on a reciprocative rod to prevent movement of liquid axially of the rod from a chamber from which the rod extends through a wall of the chamber, including, a chamber wall having an opening therein, a reciprocative rod in said opening and extending through said wall, said wall having a recess axial of said rod and forming a seal chamber, said recess having a wall portion in the form of a truncated cone extending from said wall opening and coaxial with said rod, a compressively resilient seal member around said rod within said chamber and engaging the outer periphery of said rod for sliding movement of the rod in the seal member, each of opposite ends of said seal member having the exterior periphery in the form of a truncated cone with the bases of the cones in adjacent relationship and each having an acute angle with the axis of the rod, a compression gland around said rod in said chamber and having a wall portion in the form of a truncated cone coaxial with said rod, said truncated seal member ends having the acute angle thereof less than the acute angle of the said wall portions with the said rod and non-conformable with the said wall portion under all normal conditions of pressure engagement of the said end of said seal member with the said wall portion to effect thereby substantial line engagement of the apex portions only of said ends of said seal member with the said wall portions of said wall and said gland, said seal member having annular grooves extending inwardly from the inner periphery of the seal member in radial alignment with the said truncated ends thereof providing for radial flexibility of the said end portion only, and spring means engaging said gland effective to urge the same and said seal member axially of said rod to effect pressure engagement of the apex ends of the truncated ends of the seal member with the said truncated wall portions of said wall and gland to compress the apex portions of the truncated ends of the seal member radially inwardly against the said rod.

6. A packing in accordance with claim 5 in which the said seal member is of polytetrafluoroethylene.

References Cited in the file of this patent
UNITED STATES PATENTS

| | | |
|---|---|---|
| 684,991 | Leary | Oct. 22, 1901 |
| 2,199,880 | Elliot | May 7, 1940 |
| 2,673,731 | Partiquin | Mar. 30, 1954 |
| 2,757,993 | Flick | Aug. 7, 1956 |
| 2,761,710 | Rudner | Sept. 4, 1956 |